P. MASON.
AUTOMOBILE SLEIGH.
APPLICATION FILED FEB. 21, 1916.
1,193,170.
Patented Aug. 1, 1916.
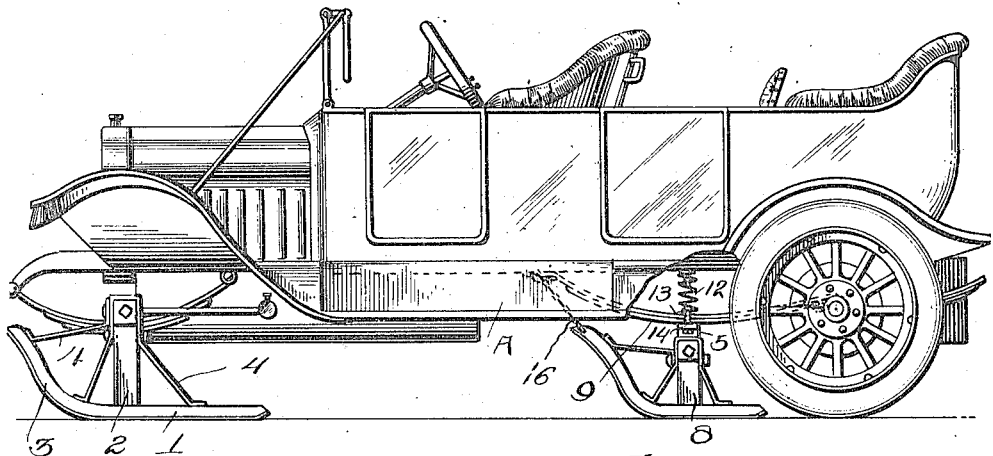
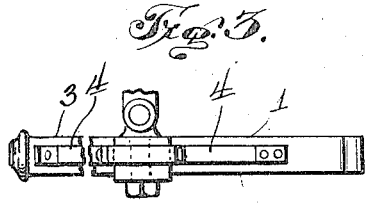
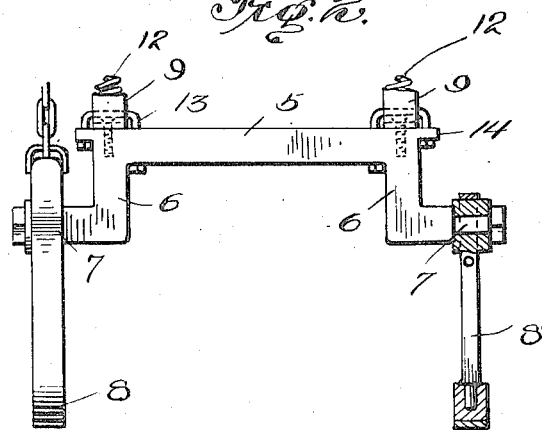
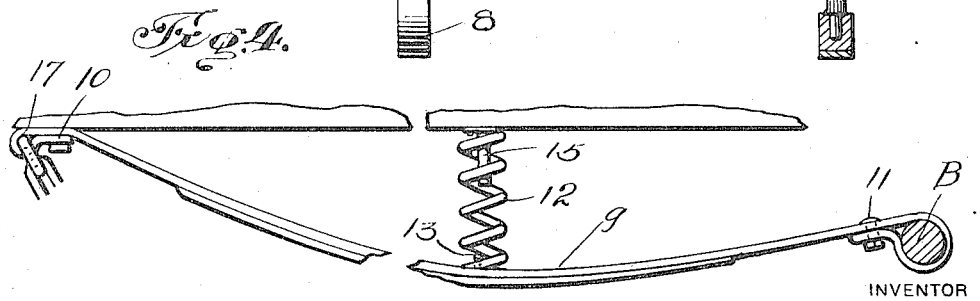
WITNESSES
Ernest Crocker
Wm. H. Mulligan
INVENTOR
Paul Mason
BY
Richard B. Owen
ATTORNEY

UNITED STATES PATENT OFFICE.

PAUL MASON, OF PARKER, IDAHO.

AUTOMOBILE SLEIGH.

1,193,170. Specification of Letters Patent. Patented Aug. 1, 1916.

Application filed February 21, 1916. Serial No. 79,664.

*To all whom it may concern:*

Be it known that I, PAUL MASON, a citizen of the United States, residing at Parker, in the county of Fremont and State of Idaho, have invented certain new and useful Improvements in Automobile Sleighs, of which the following is a specification.

This invention relates to automobile sleighs and the primary object is to provide runners for an automobile of the ordinary type by mounting runners on the forward axle in place of the wheels which are ordinarily mounted thereon and arranging an auxiliary axle provided with runners adjacent the rear wheels of the automobile in a manner whereby the automobile may be propelled by the rear wheels.

A further object of the invention is the provision of an automobile sleigh, the rear wheels of which will act as the propelling means and which will contain a rearwardly mounted spring pressed pair of runners for operating the automobile in winter when snow is on the ground.

The invention further aims to provide means whereby an ordinary automobile may be quickly and easily converted into a motor sleigh by removing the front wheels thereof and attaching runners thereto by adding an auxiliary pair of runners to the rear of the machine; the attachments as a whole consisting of comparatively few parts, simple in construction, durable and inexpensive to manufacture.

For a full description of the invention and the advantages and merits thereof, reference is to be had to the following description and the accompanying drawings, wherein is illustrated the preferred form of my invention, in which;

Figure 1 is a side elevation of an automobile showing the sleigh runners applied thereto. Fig. 2 is an elevation of the auxiliary runners, one of the runners being shown in section. Fig. 3 is a top plan view of one of the front runners, and Fig. 4 is a side detail elevation of the manner of mounting the auxiliary runners.

The automobile or motor vehicle A may be of any standard make and is provided with the usual front axle, spindle and steering knuckles. Each of the front runners 1 is provided with a standard 2 which is secured to the runner 1 and extends vertically therefrom. The front end of the runner is curved upwardly as at 3 so that obstructions may be easily passed over and braces 4 are provided which connect the runner with the standard 2 for bracing purposes, thereby providing a substantial runner which can be mounted in place of the ordinary front wheels. The standard 2 is provided with a bearing at its upper end through which the spindle of the front axle is extended in the same manner in which the front wheels are ordinarily mounted. The front runners are thereby free to turn for steering the vehicle by means of the steering rod and steering knuckle in a manner similar to the operation of the ordinary front wheels.

The springs at the rear of the body of the automobile, which ordinarily connect the body with the rear axle, and which serve to take up the jars and jolts at the rear of the machine, will be removed. It is necessary to have the rear wheels in engagement with the road-bed so that the automobile may be propelled in the usual manner, but for the purposes of obtaining the full benefit of a sleigh, it is necessary to mount the wheels in a manner that will cause them to be independent of the body with respect to the resiliency which the ordinary rear spring would provide. To accomplish this function an auxiliary rear axle 5 is provided which will have the downwardly extending arms 6 which are turned at right angles to provide the spindle bearings 7, upon which the rear runners 8 are mounted. A semi-elliptical spring 9 has one of its ends connected to the under side of the body of the automobile, as at 10, and the opposite end is connected to the rear axle B by looping one end around the axle and securing the end with a bolt 11, as shown in Fig. 4 of the drawing. Between the automobile body and the center of the semi-elliptical spring 9 is mounted a coil spring 12 which has one end secured to the under side of the automobile and the other end secured by a staple 13 to the leaf spring 9 and the axle 5. The axle 5 is provided with outstanding ears 14 and the staple 13 has one of its ends extended through the ears 14 and the opposite end extended through the axle 5, and nuts are screw threadedly mounted upon the ends of the staple 13. A stud 15 is secured to the under side of the body of the automobile and projects into the coils of the coil spring 12, thereby providing means for keeping the spring 12 in an upright position at all times.

Each of the runners 8 is provided with a standard 8' and the upper end of the standard 8' is mounted for rotatable movement upon the bearings 7 of the auxiliary axle. A chain 16 is secured to the upwardly curved ends of the runners 8 and its free end is secured to a loop 17 in the forward end of the leaf springs 9, thereby providing a limited movement of rotation for the runners 8 upon their bearings.

It will be observed that the rear end of the body of the automobile rests upon the coil springs 12 and the forward ends of the leaf springs 9, and the axle B is connected to the leaf springs 9 at their rear ends, thereby causing the rear wheels of the automobile to frictionally engage with the road bed to such an extent as to propel the vehicle when the motor imparts motion to the rear axle B.

From the foregoing it will be observed that a very simple and durable automobile sleigh has been provided, the details of which embody the preferred form. I desire it to be understood however, that slight changes or modifications in the minor details of construction may be made without departing from the spirit of the invention or the scope of the claims hereunto appended.

I claim:

1. In combination with an automobile, of runners mounted on the front axle, of an auxiliary axle arranged in the front of and adjacent the rear axle, said auxiliary axle carrying runners, a leaf spring connected to the rear axle and to the body of the automobile, and means connecting said leaf spring with said auxiliary axle.

2. In combination with an automobile, of a runner mounted on each end of the front axle, an auxiliary axle arranged in front of and adjacent the rear axle, a leaf spring connected to the rear axle and to the body of the automobile, a coil spring mounted between the automobile body and said leaf spring, and runners mounted on the auxiliary axle.

3. In combination with an automobile, having front and rear axles, said rear axle being disconnected from the automobile body, runners mounted upon the front axle, runners disposed forwardly of said rear axle, and resilient means connecting said runners with said automobile body and with said rear axle.

4. In combination with an automobile body, having its rear springs removed, of a pair of runners mounted on the front axle, leaf springs connecting the automobile body with the rear axle, an auxiliary axle mounted in front of the rear axle and in the center of the said leaf spring, runners mounted upon said auxiliary axle, and an expansion spring arranged vertically between said auxiliary axle and the automobile body.

5. In combination with an automobile body having front and rear axles, said rear axle being disconnected from the automobile body, runners mounted on the front axle, an auxiliary axle mounted in front of said rear axle, said rear axle having downwardly extending arms at each of its ends, said arms being turned outwardly at right angles to provide spindles, runners mounted upon the spindles and disposed forwardly of the rear wheels of the automobile, and resilient means connected to said axle and interposed between said auxiliary axle and the automobile body.

In testimony whereof I affix my signature in presence of two witnesses.

PAUL MASON.

Witnesses:
FRED H. MASON,
C. E. LLOYD.

Copies of this patent may be obtained for five cents each, by addressing the "Commissioner of Patents, Washington, D. C."